(12) United States Patent
Alveby et al.

(10) Patent No.: US 9,258,976 B2
(45) Date of Patent: Feb. 16, 2016

(54) TEATCUP LINER AND A TEATCUP

(75) Inventors: Nils Alveby, Bandhagen (SE); Anneli Lidmar, Huddinge (SE)

(73) Assignee: DELAVAL HOLDING AB, Tumba (SE)

( * ) Notice: Subject to any disclaimer, the term of this patent is extended or adjusted under 35 U.S.C. 154(b) by 247 days.

(21) Appl. No.: 13/988,584

(22) PCT Filed: Nov. 17, 2011

(86) PCT No.: PCT/SE2011/051382
§ 371 (c)(1),
(2), (4) Date: May 21, 2013

(87) PCT Pub. No.: WO2012/071000
PCT Pub. Date: May 31, 2012

(65) Prior Publication Data
US 2013/0239899 A1    Sep. 19, 2013

Related U.S. Application Data

(60) Provisional application No. 61/415,896, filed on Nov. 22, 2010.

(30) Foreign Application Priority Data

Nov. 22, 2010   (SE) ...................................... 1051219

(51) Int. Cl.
*A01J 5/007*   (2006.01)
*A01J 5/06*    (2006.01)
(Continued)

(52) U.S. Cl.
CPC .. *A01J 5/06* (2013.01); *A01J 5/007* (2013.01); *A01J 5/08* (2013.01); *A01J 5/16* (2013.01)

(58) Field of Classification Search
CPC ............... A01J 5/007; A01J 5/06; A01J 5/08; A01J 5/16

USPC .......... 119/14.01, 14.14, 14.15, 14.18, 14.47, 119/14.48, 14.49
See application file for complete search history.

(56) References Cited

U.S. PATENT DOCUMENTS 1,256,792 A * 2/1918 Harner ........................ 119/14.47
1,916,839 A * 7/1933 Hulbert ...................... 119/14.49
(Continued)

FOREIGN PATENT DOCUMENTS

DE    19949151    4/2001
DE    20112052    2/2003
(Continued)

OTHER PUBLICATIONS

Swedish Search Report dated May 13, 2011, corresponding to the Foreign Priority Application No. 1051219-2.
(Continued)

*Primary Examiner* — David Parsley
(74) *Attorney, Agent, or Firm* — Young & Thompson

(57) ABSTRACT

A teatcup and a teatcup liner for a teatcup to be attached to a teat of an animal for the performance of a milking operation. The teatcup liner defines an inner space for receiving the teat and a longitudinal center axis extending through the inner space. The teatcup liner is composed of at least three separate annular sections, which are attached to each other and arranged successively after each along the longitudinal center axis. A first section forms an upper part having an opening for allowing the teat to be introduced into the inner space. A second section forms a tube part engaging the teat during the milking operation. A third section forms a ring module having an inner surface facing the inner space. The ring module includes a functional member providing an additional function to the milking operation.

20 Claims, 4 Drawing Sheets

(51) Int. Cl.
*A01J 5/16* (2006.01)
*A01J 5/08* (2006.01)

(56) References Cited

U.S. PATENT DOCUMENTS

| | | | | |
|---|---|---|---|---|
| 1,982,452 | A * | 11/1934 | Persoons et al. | 119/14.53 |
| 3,308,788 | A * | 3/1967 | Noorlander | 119/14.52 |
| 3,784,235 | A | 1/1974 | Kessler et al. | |
| 4,459,939 | A * | 7/1984 | Noorlander | 119/14.49 |
| 6,176,200 | B1 * | 1/2001 | Petterson | 119/14.47 |
| 6,308,656 | B1 | 10/2001 | Milbrath et al. | |
| 6,997,136 | B1 * | 2/2006 | Coates | 119/14.47 |
| 7,650,854 | B2 | 1/2010 | Petterson et al. | |
| 7,861,669 | B2 * | 1/2011 | Alveby | 119/14.08 |
| 2008/0035064 | A1 | 2/2008 | Petterson et al. | |
| 2009/0126637 | A1 | 5/2009 | Obermuller | |
| 2009/0165724 | A1 | 7/2009 | Mader et al. | |
| 2009/0235868 | A1 | 9/2009 | Kassibrahim | |
| 2009/0320760 | A1 | 12/2009 | Torgerson et al. | |

FOREIGN PATENT DOCUMENTS

| | | |
|---|---|---|
| EA | 200602256 | 4/2007 |
| EP | 1 155 610 | 6/1987 |
| EP | 0 527 509 | 2/1993 |
| EP | 0645079 | 3/1995 |
| FR | 1 123 129 | 9/1956 |
| FR | 2012524 | 3/1970 |
| JP | 2008-502359 | 1/2008 |
| SU | 1739915 | 5/2009 |
| WO | 2005-120216 | 12/2005 |
| WO | 2005/120217 | 12/2005 |
| WO | 2006/061197 | 6/2006 |
| WO | 2006/135917 | 12/2006 |

OTHER PUBLICATIONS

International Search Report dated Mar. 30, 2012, corresponding to PCT/SE/2011/051382.

Supplemental International Search Report dated Mar. 14, 2013, corresponding to PCT/SE/2011/051382.

Japanese Office Action, dated Jun. 19, 2015, in corresponding Japanese Patent Application No. 2013-539795.

* cited by examiner

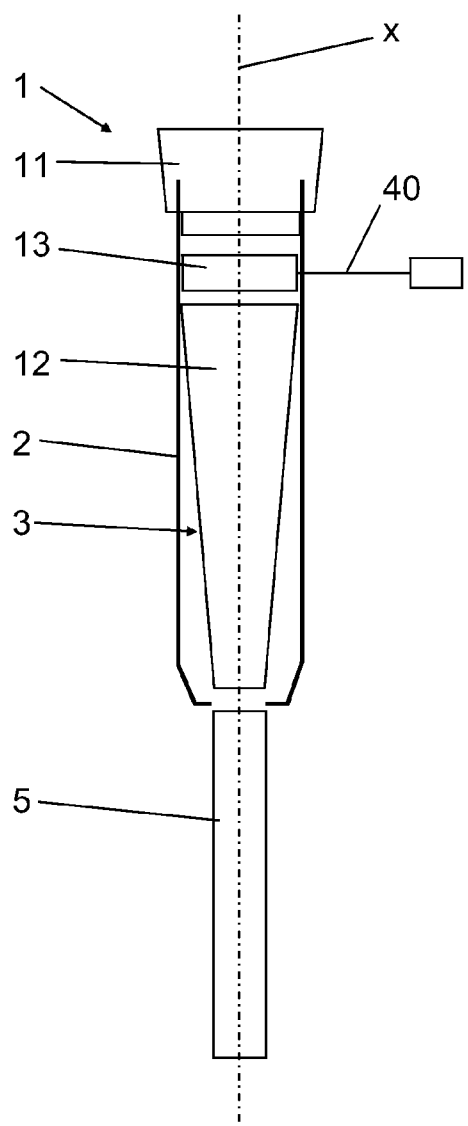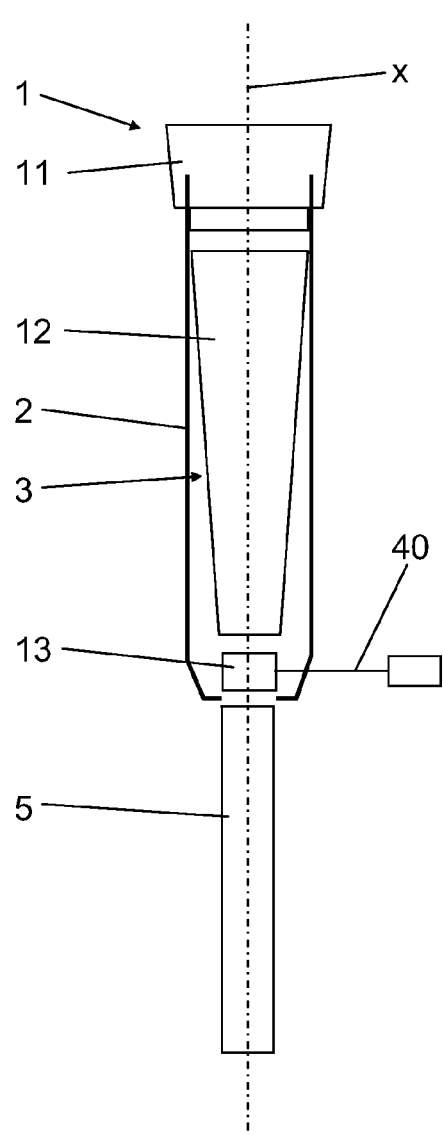

TEATCUP LINER AND A TEATCUP

THE FIELD OF THE INVENTION AND PRIOR ART

The present invention refers to a teatcup liner according to the preamble of claim 1. The invention also refers to a teatcup comprising such a teatcup liner. It is known to provide a teatcup or a teatcup liner with various additional functions as can be seen in the prior art documents discussed below. However, such additional functions tend to make the manufacture of the teatcup more complicated and hence more expensive.

US 2009/0126637 discloses a teatcup liner for a teatcup to be attached to a teat of an animal for the performance of a milking operation, the teatcup liner defining an inner space for receiving a teat. The teatcup liner may be composed of two separate sections which are attached to each other and arranged successively after each along a longitudinal centre axis of the teatcup liner. A first of the sections forms an upper part having an opening for allowing the teat to be introduced into the inner space, and a tube part having a first annular connection surface and a second annular connection surface. The second section forms a short milk conduit which comprises a functional member providing an additional function to the milking operation. The functional member comprises two annular electrodes for measuring the conductivity of the milk flowing through the teatcup liner.

WO 2006/135917 shows a dip application arrangement. The arrangement comprises a teatcup liner having an upper part and an integral tube part. The upper part has a lip defining an opening for allowing introduction of the teat. Immediately beneath the lip inside the upper part, there is provided a dip applicator, in the form a part of an annular chamber, see FIGS. 4 and 18. The dip applicator also comprises an inlet nipple and a number of holes facing the inner space of the teatcup liner and configured for supplying dip liquid onto the teat in the inner space.

U.S. Pat. No. 7,650,854 discloses a teatcup liner for a teatcup to be attached to a teat of an animal for the performance of a milking operation, the teatcup liner defining an inner space for receiving a teat. The teatcup liner is, prior to the actual use thereof, composed of three separate annular sections which are attached to each other and arranged successively after each other along a longitudinal centre axis of the teatcup liner. A first of the sections forms an upper part having an opening for allowing the teat to be introduced into the inner space. A second of the sections forms a tube part having a first annular connection surface and a second annular connection surface. A third of the sections is a tool, which permits gripping of the teatcup liner for being pulled to the correct position in the teatcup shell. When the teatcup liner is correctly positioned, the third section is removed from the teatcup liner, and will thus not remain during the milking operation.

EP-1 155 610 discloses a milking arrangement comprising a plurality of teatcups, a respective milk line from each of the teatcups. A buffer container is provided on the milk line. Downstream the buffer container, a member is provided on the milk line for measuring the milk quantity flowing in the milk line.

SUMMARY OF THE INVENTION

The object of the present invention is to provide a teatcup liner which can be manufactured in an easy manner and adapted to incorporate further functions depending on different specific uses of the teatcup liner.

This object is achieved by means of the teatcup liner initially defined, which is characterised in that a third section of the sections forms a ring module having an inner surface facing the inner space, wherein the ring module comprises a functional member providing an additional function to the milking operation.

By designing the teatcup liner in a modular way in accordance with the present invention, the third section in the form of a ring module may in an easy manner be incorporated in the teatcup liner at a suitable position of the teatcup liner. An additional function may thus in an easy and flexible manner be added to the teatcup liner and the teatcup. The second section, forming the elongated tube exerting the substantial pressure on the teat, may remain without any changes or modification irrespective of the position and the specific function of the third section. The first section, forming the upper part with the opening for the teat, may also remain without any changes or modifications irrespective of the position and the specific function of the third section. The inventors have realised the advantage of the modular design of the teatcup liner making it possible to produce a large number of various kinds of teatcup liners from a relatively small number of modules or sections.

According to an embodiment of the invention, one of the sections forms a lower section connected to or connectable to a milk-conveying member via a connection mechanism. The second section or the third section, or an optional further section, may thus be connected in any suitable manner to the milk-conveying member. The milk-conveying member may form a short milk hose connected to a claw of a milking member. The milk-conveying member may also be directly connected to a suitable milk-receiving unit for receiving milk from one single quarter of the udder of the animal.

According to an embodiment of the invention, the sections are attached to each other via respective connection mechanisms, which have such a common configuration that the first section optionally is connectable to the second section or the third section.

According to an embodiment of the invention, each connection mechanism includes a primary connecting element provided on one of the sections and a corresponding secondary connecting element provided on the other of the sections to be attached to each other, the primary connecting element and the secondary connecting element being configured to fit together to form a secure connection between the sections to be attached to each other. Advantageously, the primary connecting element and the secondary connecting element are integral with the respective section.

According to an embodiment of the invention, the primary connecting element of the first section is configured to fit together to form a secure connection with the secondary connecting element of optionally any one of the second section and the third section. Consequently, the first section may comprise a primary connecting element to be attached to a secondary connecting element of the second section or the third section.

According to an embodiment of the invention, the primary connecting element of optionally any one of the second section and the third section is configured to fit together to form a secure connection with the secondary connecting element of the milk-conveying member. Consequently, the intermediate section, formed by the second section or the third section, may comprise said secondary connecting element to be attached to the primary connecting element of the first section and a primary connecting element to be attached to a secondary connecting element of the lower section formed by the third section or the second section.

According to an embodiment of the invention, the connection mechanism forms a releasable connection, such as a snap connection or a thread connection. According to another embodiment of the invention, the connection mechanism forms a permanent connection, such as a glue connection, a fuse connection or a vulcanisation connection. A combination of a releasable connection and a permanent connection is also possible.

According to an embodiment of the invention, the third section is provided between the first section and the second section. According to another embodiment, the second section is provided between the first section and the third section.

According to an embodiment of the invention, the functional member comprises at least one conductor element extending through the ring module to the inner surface. Advantageously, the conductor element may form a channel configured to conduct a medium into or out from the inner space. For instance, the channel may be configured to supply a liquid, such as a disinfectant solution, to the inner space. The channel may also be configured to supply a gas, such as air, to or from the inner space. In this case the channel may be provided for letting in air in order to facilitate the flow of milk through the inner space and to a milk-collecting member.

According to an embodiment of the invention, the functional member comprises at least one sensor probe configured to sense a parameter and to provide a signal depending on the sensed parameter. Advantageously, the conductor element may then be configured to conduct the signal provided by the sensor probe. The parameter may comprise at least one of the pressure in the inner space, the temperature in the inner space, the flow of the milk, the electrical conductivity of the milk, and the presence of blood in the milk. The sensor probe may be designed in various ways. For instance, the sensor probe may consist of or comprise an annular part with an inner surface facing the inner space.

According to an embodiment of the invention, the functional member comprises at least one light-emitting element provided in the ring module and configured to emit light, especially UV-light, towards the inner space. With such light-emitting elements, bacterial growth, or growth of other microorganisms, may be efficiently reduced or prevented in the teatcup liner, so that the amount of bacteria and microorganisms in the milk may be kept on an acceptable level.

According to an embodiment of the invention, the conductor element may be configured to conduct a voltage or UV-light to the light emitting element.

According to an embodiment of the invention, the teatcup liner comprises a fourth separate annular section, which is attached to at least one of the other sections and forms a ring module having an inner surface facing the inner space, and wherein the ring module comprises a functional member providing an additional function to the milking operation. The teatcup liner is in this embodiment thus composed of at least four separate annular sections, which are attached to each other and arranged successively after each other along the longitudinal centre axis. Advantageously, the third section may then be provided between the first section and the second section, whereas the fourth section is provided below the second section, or between the second section and the milk-conveying member.

The object is also achieved by means of the teatcup initially defined, which comprises a teatcup shell and a teatcup liner as according to any on of the preceding claims.

BRIEF DESCRIPTION OF THE DRAWINGS

The present invention will now be explained more closely by means of a description of various embodiments and with reference to the drawings attached hereto.

FIG. 1 shows schematically a side view of a teatcup with a teatcup liner according to a first embodiment of the invention.

FIG. 2 shows schematically a side view of a teatcup with a teatcup liner according to a second embodiment of the invention.

DETAILED DESCRIPTION OF VARIOUS EMBODIMENTS OF THE INVENTION

Figure 3:
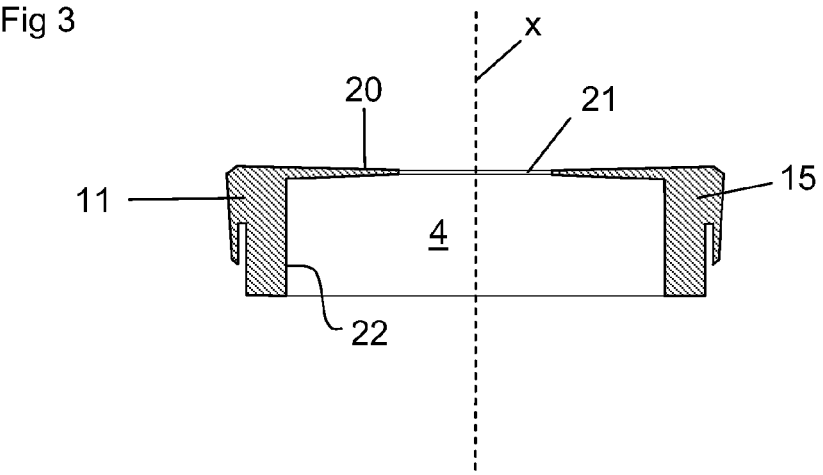
FIG. 3 shows a sectional view of a first section of the teatcup liner.

FIG. 1 refers to a first embodiment and discloses a teatcup 1 to be attached to a teat of an animal for the performance of a milking operation. The teatcup 1 comprises a teatcup shell 2 and a teatcup liner 3 mounted in the teatcup shell 2. The teatcup liner 3 defines an inner space 4, see FIGS. 3, 4, 6 and 7, for receiving the teat. A longitudinal centre axis x extends through the inner space 4. The teatcup liner is connected or connectable to a milk-conveying member 5.

The teatcup liner 3 of the first embodiment (disclosed in an exploded side view) comprises or is composed of three separate annular sections 11-13. The annular sections 11-13 are shown separated in FIG. 1, but are attached to each other when the teatcup liner 3 is used. The annular sections 11-13 are arranged successively after each other along the longitudinal centre axis x.

A first section 11 of the sections 11-13 forms an upper part 15 of the teatcup liner 3, see FIG. 3. The upper part 15 comprises a lip 20 extending inwardly towards the longitudinal centre axis x and defines an opening 21 for allowing the teat to be introduced into the inner space 4. The upper part 15 has an inner surface 22 facing the inner space 4.

Figure 4:
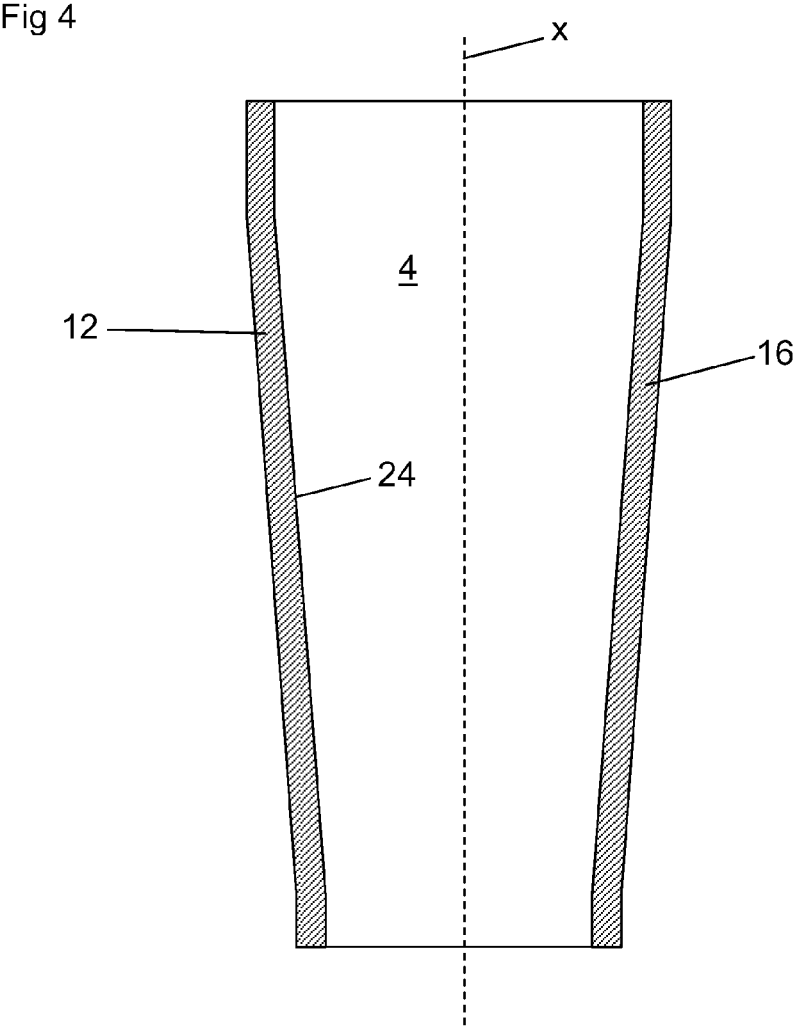
FIG. 4 shows a sectional view of a second section of the teatcup liner.

A second section 12 of the sections 11-13 forms a tube part 16, see FIG. 4, configured to engage the teat during the milking operation. The tube part 16 has an inner surface 24 facing the inner space 4.

Figure 7:
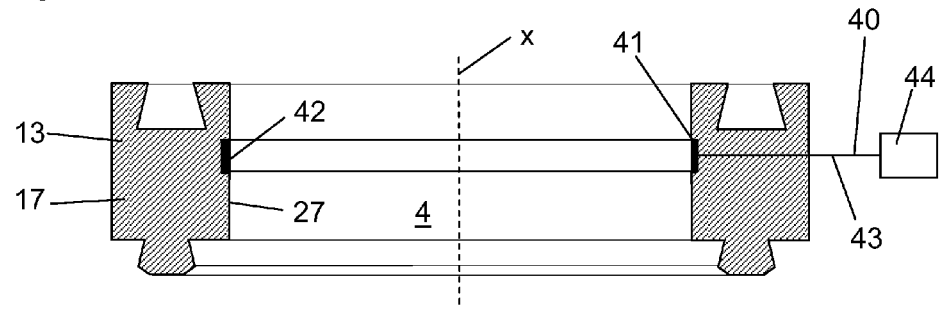
FIG. 7 shows a sectional view of an example of a third section of the teatcup liner with a functional member including a sensor probe.
Figure 8:
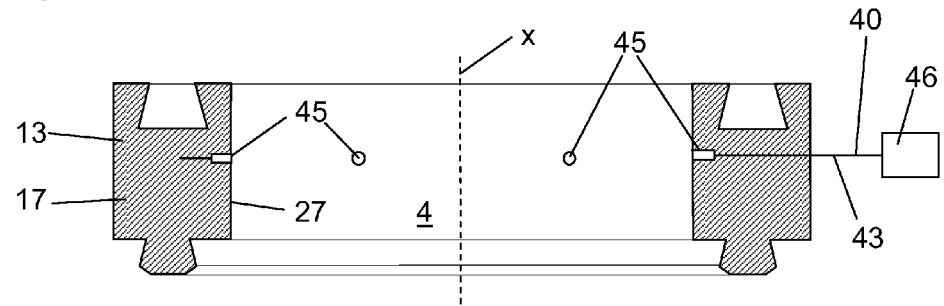
FIG. 8 shows a sectional view of a further example of a third section of the teatcup liner with a functional member including a number of light-emitting elements.
Figure 9:
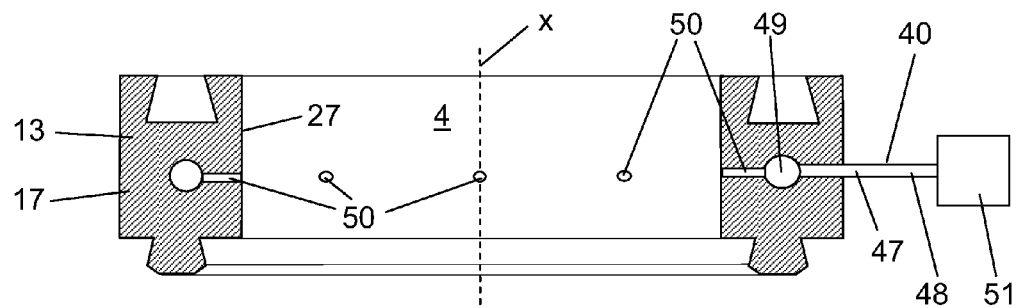
FIG. 9 shows a sectional view of a further example of a third section of the teatcup liner with a functional member including a channel.
Figure 10:
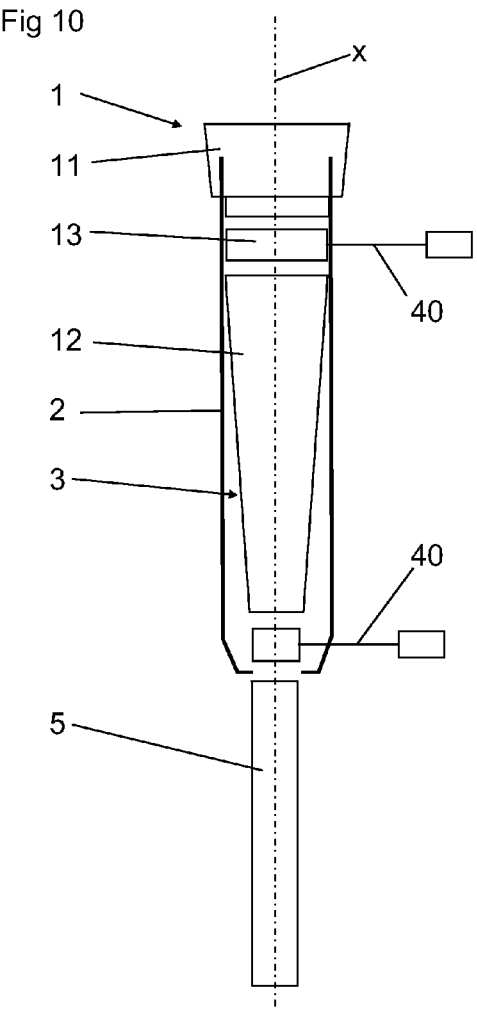
FIG. 10 shows schematically a side view of a teatcup with a teatcup liner according to a third embodiment of the invention.

A third section 13 of the sections 11-13 forms a ring module 17, see FIGS. 7-9, having an inner surface 27 facing the inner space 4. The ring module 17 comprises at least one functional member providing an additional function to the milking operation. The functional member and the additional function will be described more closely below.

Figure 5:
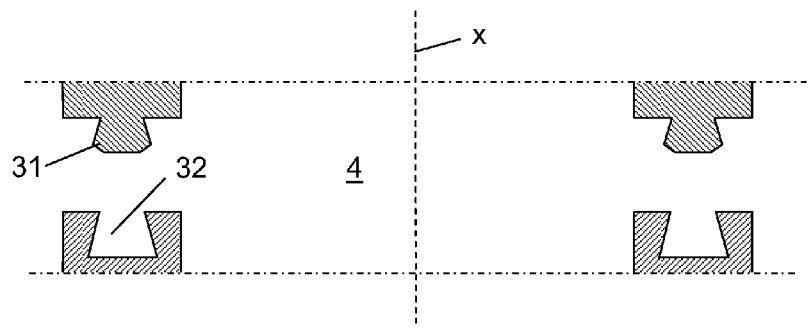
FIG. 5 shows a first variant of a connection mechanism of the teatcup liner.
Figure 6:
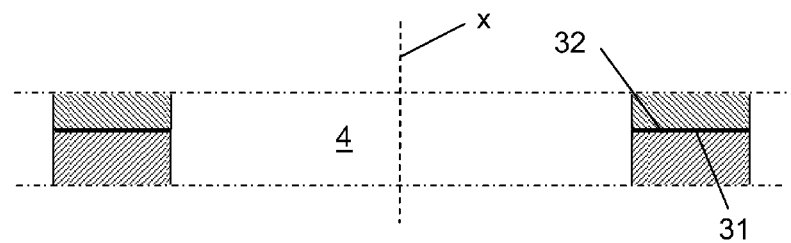
FIG. 6 shows a second variant of a connection mechanism of the teatcup liner.

The sections 11-13 are attached to each other via respective connection mechanisms, see FIGS. 5 and 6. Each connection mechanism includes a primary connecting element 31 provided on one of the sections 11-13 and a corresponding secondary connecting element 32 provided on the other of the sections 11-13 to be attached to each other. The primary connecting element 31 and the secondary connecting element 32 are configured to fit together to form a secure connection between the sections 11-13 to be attached to each other. In the embodiments disclosed, the primary connecting element 31 and the secondary connecting element 32 form an integral part of the respective section 11-13.

In a first variant shown in FIG. 5, the connection mechanism forms a releasable connection. Such a releasable connection mechanism is in FIG. 5 exemplified as a snap connection, wherein the primary connecting element 31 comprises an annular projection that snaps into an annular groove of the secondary connecting element 32. The releasable connection mechanism may also be realised by other means, such as a thread connection (not disclosed), whereby the primary connecting element 31 comprises an internal or external thread and the secondary connecting element 32 a corresponding external or internal thread.

In a second variant shown in FIG. 6, the connection mechanism forms a permanent connection. Such a permanent connection mechanism may be formed by a glue connection, a fuse connection or a vulcanisation connection. In the second variant, the primary connecting element 31 comprises or consists of a suitable surface which fits to a corresponding surface of the secondary connecting element 32. The surfaces are brought together and permanently joined by means of gluing, fusing or melting, or vulcanisation.

In a third variant, the connection mechanism comprises a combination of a releasable connection and a permanent connection. In for instance a snap connection, the material of the primary connecting element 31 and the secondary connecting element 32 may be at least partly melted to form a permanent connection.

In the first embodiment, the second section 12 forms a lower section of the teatcup liner 3 and is connected or connectable to the milk-conveying member 5, which means that the third section 13 is provided between the first section 11 and the second section 12. The third section 13 is provided inside the teatcup shell 2. Consequently, the first section 11 is attached to the third section 13, which is attached to the second section 12 by means of respective connection mechanisms. The second section 12 may be attached to the milk-conveying member 5 by means of a connection mechanism as described above, or by any other suitable connection. The milk-conveying member 5 may also form an integral part of the second section 12 in the first embodiment.

The second embodiment differs from the first embodiment in that the third section 13 forms the lower section of the teatcup liner 3 and is connected or connectable to the milk-conveying member 5, and that the second section 12 thus is provided between the first section 11 and the third section 13. The third section 13 may be attached to the milk-conveying member 5 by means of a connection mechanism as described above, or by any other suitable connection. The milk-conveying member 5 may also form an integral part of the third section 13 in the second embodiment. In FIG. 2, the third section 13 is provided inside the teatcup shell 2. However, in the second embodiment it is possible to locate the third section 13 outside or partly outside the teatcup shell 13.

The third section 13 forms a ring module 17 comprising at least one functional member as mentioned above. In FIGS. 7-9, the ring module 17 of the third section 13 is shown with one functional member, but it is to be noted that more than one functional member may be comprised by the ring module 17 to provide more than one additional function to the teatcup liner 3.

In the example shown in FIG. 7, the functional member of the ring module 17 comprises a conductor element 40 extending through the ring module 17 to the inner surface 27. Furthermore, the functional member comprises a sensor probe 41 configured to sense a parameter and to provide a signal depending on the sensed parameter. The sensor probe 41 comprises or consists of an annular part with an inner surface 42 facing the inner space 4. The conductor element 40 comprises or consists of an electrical or optical conductor 43 and is connected to the sensor probe 41 and to a unit 44 for transmission and/or processing of the signal. The conductor element 40 is configured to conduct the signal provided by the sensor probe 41, from the sensor probe 41 to the unit 44. The unit 44 may be integrated in the teatcup 1, i.e. in the teatcup liner 3 or the teatcup shell 2.

In a first example, the sensor probe 41 may be configured to sense a parameter being or being related to the pressure prevailing in the inner space 4. The sensor probe 41 may in this example comprise a pressure sensor of any suitable kind. It is to be noted that such a pressure sensor does not have to comprise any annular part. In this example, the ring module 17 with the sensor probe 41 may be provided at the position shown in FIG. 1 or 2.

In a second example, the sensor probe 41 may be configured to sense a parameter being or being related to the temperature in the inner space 4. The sensor probe 41 may in this example comprise a temperature sensor of any suitable kind. It is to be noted that such a temperature sensor does not have to comprise any annular part. In this example, the ring module 17 with the sensor probe 41 may be provided at the position shown in FIG. 1 or 2.

In a third example, the sensor probe 41 may be configured to sense a parameter being or being related to the flow of the milk. The sensor probe 41 may in this example comprise a suitable flow sensor for sensing the mass flow of the milk flowing through the inner space 4. The sensor probe 41 may have any suitable shape. For instance the sensor probe 41 may comprise two annular parts provided after each other along the longitudinal centre axis x and each having an inner surface 42 facing the inner space 4. In this example, the ring module 17 with the sensor probe 41 is advantageously provided at the position shown in FIG. 2.

In a fourth example, the sensor probe 41 may be configured to sense a parameter being or being related to the electrical conductivity of the milk. The sensor probe 41 may in this example comprise any suitable electrode means for sensing the electrical conductivity indicating an enhanced concentration of micro-organisms in the milk flowing through the inner space 4. The sensor probe 41 may have any suitable shape. For instance the sensor probe 41 may comprise two annular parts or electrodes provided after each other along the longitudinal centre axis x and each having an inner surface 42 facing the inner space 4. In this example, the ring module 17 with the sensor probe 41 may be provided at the position shown in FIG. 2.

In a fifth example, the sensor probe 41 may be configured to sense a parameter being or being related to the presence of blood in the milk. The sensor probe 41 may in this example comprise any optical means for sensing a deviating colour of the milk flowing through the inner space 4. The sensor probe 41 may have any suitable shape. For instance the sensor probe 41 may comprise a light emitting diode and a photocell sensing the light emitted by the diode and reflected by the milk. In this example, the ring module 17 with the sensor probe 41 may be provided at the position shown in FIG. 2.

It is to be noted that two or more of these exemplified sensor probes 41 may be comprised by the ring module 41. Moreover, it can be mentioned that sensor probes 41 configured for sensing various substances in the milk may be provided in the ring module 17, such as for sensing proteins, somatic cells, fat content etc.

In the example shown in FIG. 8, the functional member comprises a number of light-emitting elements 45, such as one, two, three or more light-emitting elements 45. The light-emitting elements 45 may be configured to emit UV-light having a bactericidal effect in order reduce or remove bacteria and/or other microorganisms from the interior of the teatcup liner 3, and thus from the milk flowing through the teatcup liner 3. The light-emitting elements 45 may be provided in an annular configuration in the ring module 17, wherein the light-emitting elements 45 are directed inwardly. Alternatively, the functional member may comprise a light-conducting material, so that the light can be conducted from one light-emitting element 45 all around the functional member and be directed inwardly.

The light-emitting elements 45 may comprise or consist of Light Emitting Diodes, LED, providing UV-light of an appropriate wavelength. The light-emitting elements 45 may be connected to a source 46 providing an electrical voltage to the light-emitting elements 45 via the conductor element 40 in the form of the electrical conductor 43. In case several such light-emitting elements 45 are provided, each element 45 may for example be connected to the source 45 via a respective electrical conductor 43 or via a common electrical conductor 43 arranged along an annular path.

Alternatively, the light-emitting elements 45, for example formed by light-emitting ends of optical fibres, may be connected to a source 46 providing UV-light to the light-emitting elements 45 via the conductor element 40 in the form of the optical conductor 43. In case several such light-emitting elements 45 are provided, each element 45 may for example be connected to the source 45 via a respective optical conductor 43 or via a common optical conductor 43 arranged along an annular path.

Furthermore, as shown in FIG. 9, the conductor element 40 may form a channel 47 extending through ring module 17. The channel 47 is configured to conduct a medium into or out from the inner space 4. The channel 47 may comprise a first part 48 extending into the ring module 17, a second annular part 49 extending annularly in the ring module 17 and one or several third parts 50. The first part 48 is connected to the second annular part 49. The third part 50 extends from the second annular part 49 to and through the inner surface 27 into the inner space 4. The channel 47 may be connected to a unit 51 for supplying or discharging the medium.

In a sixth example, the channel 47 is configured to supply a liquid to the inner space 4 from the unit 51. The liquid may comprise or consist of a disinfectant solution for cleaning of the teat as a part of the milking operation before or after the performance of the milking. In this example, the ring module 17 with the channel 47 may advantageously be provided at the position shown in FIG. 1.

In a seventh example, the channel 47 is configured to supply or withdraw gas, such as air to or from the inner space 4. For instance, air, or any inert gas such as nitrogen, may be supplied to the inner space 4 in order to enhance the flow of milk through the teatcup liner 3 and the milk-conveying member 5 to any suitable milk-collecting member (not disclosed). In this example, the ring module 17 with the channel 47 may advantageously be provided at the position shown in FIG. 1 or 2. Furthermore, the functional member may comprise the sensor probe 41 configured to sense the pressure in the inner space 4. The supply of gas may then be controlled in response to the pressure prevailing in the inner space 4.

FIG. 9 shows a third embodiment that differs form the first and second embodiments in that the teatcup liner comprises also a fourth separate annular section 14. The fourth section 14 forms a ring module 17 of the kind described above so that the teatcup liner 3, in the third embodiment, comprises two ring modules 17 each comprising one or more functional members providing an additional function to the milking operation. In the third embodiment, the third section 13 is provided between the first section 11 and the second section 12, and the fourth section 14 is provided at the second section 12 between second section and the milk-conveying member 5. The fourth section may be provided inside the teatcup shell 2 as indicated in FIG. 9, or outside or partly outside the teatcup shell 2.

It can also be mentioned that the third and fourth sections 13, 14 can be provided beside each other at the intermediate position between the first section 11 and the second section 12, or below the second section 12. Furthermore, the teatcup liner may comprise further sections, each being a ring module with a functional member, in addition to the third and fourth sections 13, 14.

In FIGS. 1, 2, 4 and 10, the second section 12 forming the tube part 16 is shown with a conical or tapering shape, i.e. the diameter at the upper end is longer than the diameter at the lower end of the tube part 16. It is to be noted that the tube part 16 of the teatcup liner 3 according to an alternative embodiment may have a cylindrical shape with a constant, or substantially constant, diameter along the length of the tube part 16. In this embodiment, one and the same third section 13, forming the ring module 17 with the functional member, may then be provided between the first section 11 and the second section 12, below the second section 12 or between the second section 12 and the milk-conveying member 5. This cylindrical configuration of the tube part 16 also permits the third section 13 and the fourth section 14 of the third embodiment to be identical at least with respect to the dimensions.

The present invention is not limited to the embodiments disclosed but may be modified and varied within the scope of the following claims.

The invention claimed is:

1. A modular teatcup liner for a teatcup (1) to be attached to a teat of an animal for performance of at least a milking operation function, the teatcup liner comprising:
   an inner space (4) for receiving the teat during the milking operation function, and a longitudinal center axis (x) extending through the inner space (4),
   the teatcup liner being composed of at least three separate annular sections (11-14),
   a first section (11) of the sections (11-14) being an upper part (15) having an opening (21) allowing introduction of the teat into the inner space (4),
   a second section (12) of the sections (11-14) being a tube part (16) engaging the teat during the milking operation function, and
   a third section (13) of the sections (11-14) being a ring module (17) having an inner surface (27) facing the inner space (4),
   the first and second sections being attachable to each other successively, without the third section, to define the teatcup liner with the milking operation function,
   the first, second, and third sections (11-14) being attachable to each other and arranged successively after each other along the longitudinal center axis (x),
   wherein the ring module (17) comprises a first functional member providing a first additional function to the teatcup liner (2) in addition to the milking operation function, the first additional function being selected from the group consisting of a cleaning function, a disinfecting function, a milk flow facilitating function, and a sensing function.

2. A teatcup liner according to claim 1, wherein one of i) the second section (12), and ii) the third section (13) forms a lower section connectable to a milk-conveying member (5) via a connection mechanism.

3. A teatcup liner according to claim 1, wherein,
the first, second, and third sections (11-14) are attached to each other via respective connection mechanisms with a common configuration allowing the first section (11) to be selectively connectable to the second section and to third section,
in a first configuration, the first section (11) is attached to the second section (12), and
in a second configuration, the first section (11) is attached to the third section (13).

4. A teatcup liner according to claim 3, wherein,
each connection mechanism includes a primary connecting element (31) provided on one of the sections (11-14) and a corresponding secondary connecting element (32) provided on another of the sections (11-14) to be adjacently attached to each other,
the primary connecting element (31) and the secondary connecting element (32) are configured to fit together to form a secure connection between adjacently attached sections (11-14).

5. A teatcup liner according to claim 4, wherein,
the primary connecting element (31) of the first section (11) is configured to fit together to form a secure connection with the secondary connecting element (32) of the second section (12), and
the primary connecting element (31) of the first section (11) is configured to fit together to form a secure connection with the secondary connecting element (32) of the third section (13).

6. A teatcup liner according to claim 5, wherein,
the primary connecting element (31) of the second section (12) is configured to fit together to form a secure connection with a secondary connecting element (32) of the milk-conveying member (5), and
the primary connecting element (31) of the third section (13) is configured to fit together to form a secure connection with the secondary connecting element (32) of the milk-conveying member (5).

7. A teatcup liner according to any claim 1, wherein third section (13) is arranged between the first section (11) and the second section (12).

8. A teatcup liner according to claim 1, wherein the second section (12) is arranged between the first section (11) and the third section (13).

9. A teatcup liner according to claim 1, comprising plural of said third section, wherein,
the ring module comprised of the first functional member providing the first additional function is a first said third section,
a second said third section comprises a second functional member providing a second additional function in addition to the milking operation function, and
the first section, the second section, and the second said third section are attachable to each other and arranged successively after each other along the longitudinal center axis (x) to define the teat cup liner with the second additional function in addition to the milking operation function,
the second additional function being selected from the group consisting of the cleaning function, the disinfecting function, the milk flow facilitating function, and the sensing function, and being a function different from the first additional function.

10. A teatcup liner according to claim 9, wherein each of the first functional member and the second functional member comprises at least one conductor element (40) extending through the ring module (17) to the inner surface (27).

11. A teatcup liner according to claim 10, wherein the conductor element (40), of one of the first functional member and the second functional member, defines a channel (47) connected to conduct a medium into or out from the inner space (4).

12. A teatcup liner according to claim 11, wherein the channel (47) is configured to supply liquid to the inner space (4).

13. A teatcup liner according to claim 10, wherein at least one the first functional member and the second functional member further comprises at least one sensor probe (41) configured to sense a milking operation parameter and to provide a signal depending on the sensed parameter.

14. A teatcup liner according to claim 13, wherein the conductor element (40) is connected to conduct the signal provided by the sensor probe (41) outside the third section.

15. A teatcup liner according to claim 13, wherein,
the sensor probe (41) of the first functional member is at least one of i) a pressure sensor for sensing pressure in the inner space (4), ii) a temperature sensor for sensing temperature in the inner space (4), iii) a milk flow sensor for sensing flow of the milk, iv) an electrical conductivity sensor for sensing electrical conductivity of the milk, and v) a blood-sensing sensor for sensing a presence of blood in the milk, and
the sensor probe (41) of the second functional member is at least another one of i) the pressure sensor for sensing pressure in the inner space (4), ii) the temperature sensor for sensing temperature in the inner space (4), iii) the milk flow sensor for sensing flow of the milk, iv) the electrical conductivity sensor for sensing electrical conductivity of the milk, and v) the blood-sensing sensor for sensing a presence of blood in the milk.

16. A teatcup liner according to claim 13, wherein the sensor probe (41) comprises an annular part with an inner surface (42) facing the inner space (4).

17. A teatcup liner according to claim 9, wherein,
wherein a combination of the first section, the second section, the first said third section, and the second said third section attached to each other and arranged successively after each other along the longitudinal center axis (x) define the teat cup liner with both the first additional function and the second additional function, in addition to the milking operation function.

18. A teatcup liner according to claim 17, wherein,
the first said third section is attachable between the first section (11) and the second section, and
the second said third section is attachable below the second section.

19. A teatcup liner according to claim 17, wherein,
the first section, the second section, the first said third section, and the second said third section are attachable to each other, in different combinations, via respective connection mechanisms with a common configuration allowing the first section to be selectively connectable to the second section, to the first said third section, and to the second said third section,
in a first combination, the first said third section and the second said third section are connected beside each other between the first section and the second section, in a second combination, the first said third section and the second said third section are connected beside each other and the first section and the second section are connected besides each other, and in a third combination, the first section is attached to the first said third section, the first said third section is attached to the second section, and the second section is attached to the second said third section.

20. A teatcup liner according to claim 9, one of the first functional member comprises at least one light-emitting element configured to emit UV-light having a bactericidal effect on an interior of the teatcup liner.

* * * * *